Nov. 1, 1960 — W. P. TANNEHILL — 2,958,157
BIRD CALL
Filed Sept. 8, 1959
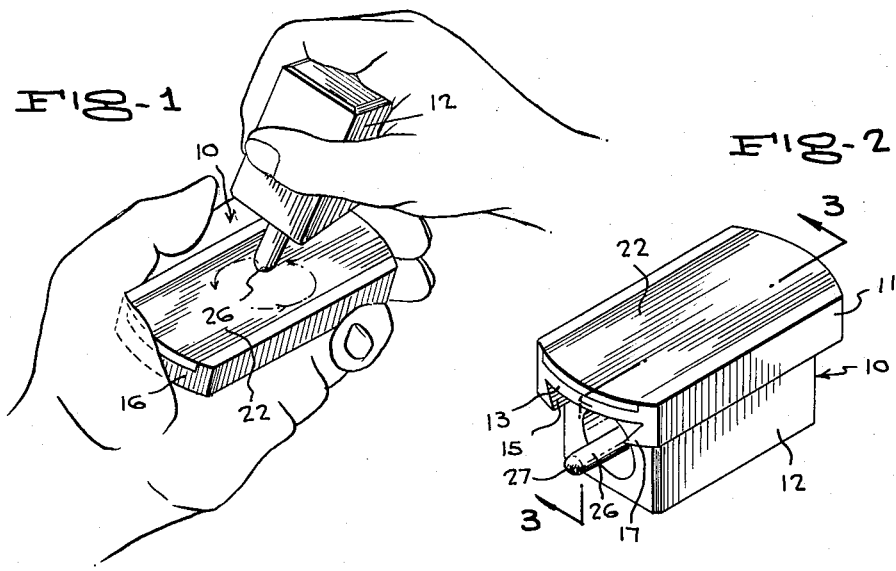
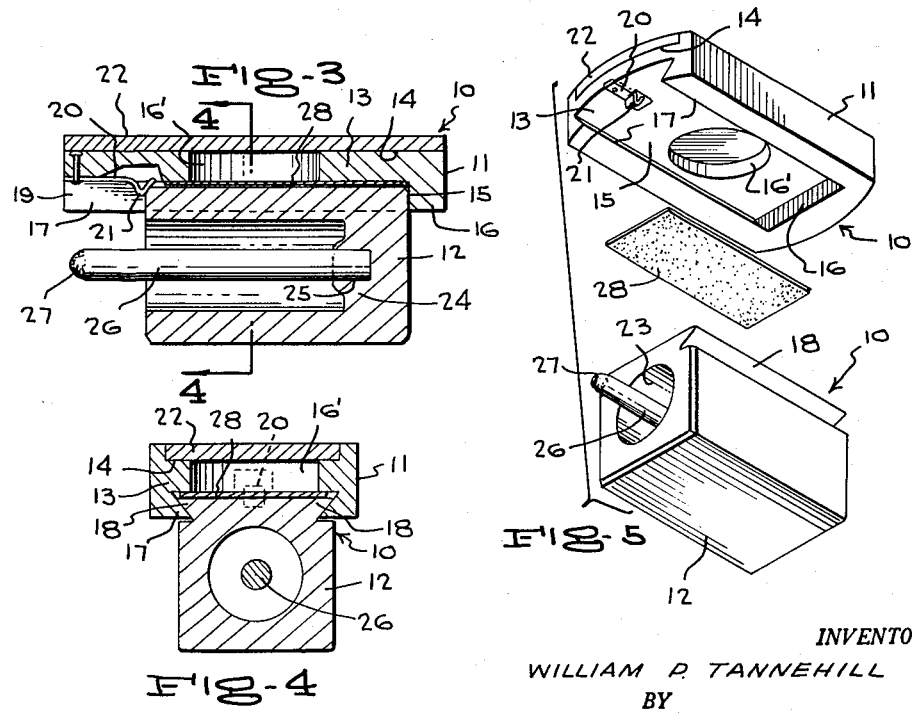
INVENTOR.
WILLIAM P. TANNEHILL

United States Patent Office 2,958,157
Patented Nov. 1, 1960

2,958,157
BIRD CALL

William Porterfield Tannehill, 436 Greenville Ave., Staunton, Va.

Filed Sept. 8, 1959, Ser. No. 838,559

1 Claim. (Cl. 46—177)

This invention relates to a new and novel construction of bird call and particularly adapted to produce a sound simulating the yelping of wild turkeys, and it consists in the constructions, arrangements and combinations herein described and claimed.

It is the cardinal object of the invention to provide a sound producing box wherein the top thereof securely houses a sound producing surface, the box being formed with a suitable opening intermediate the length thereof and over which the sound producing surface is snugly seated, a sound vibrator being employed in conjunction with the sounding surface which upon circular motions upon said surface will produce remarkably similar sounds to that of the yelp or call of wild turkeys.

More specifically, it is an important object of the invention to provide a substantially rectangular sound box which is formed with a medial division wall intermediate the height of the box, thus forming opposed upper and lower compartments, the division wall having a medially located opening; the upper compartment securely mounting a friction plate which lies snugly upon and over the opening; the lower compartment forming a storage space for detachable retention of a vibrator a d surface restoring means for the friction plate, each of which are employed in conjunction with production of sound.

It is also an important object of the invention to provide a novel construction of vibrator in the form of a hand grip, which is hollow for the major portion of the length thereof, the vibrator element being secured in the closed end of the grip, the free end projecting a distance beyond the open end of the grip portion of the vibrator, whereby the vibrating element has a substantial portion of its length enclosed within the hollow portion of the grip enabling the element to vibrate freely within the hollow portion and thus produce variations of sound depending upon the motions given the vibrating element, as well as the surface of the friction plates contacted.

Additional objects, advantages and features of invention will be apparent from the following description, considered in conjunction with the accompanying drawing, wherein Figure 1 is a perspective view illustrating one possible operation of the turkey call.

Figure 2 is a similar view of an assembled caller.

Figure 3 is a longitudinal section on the line 3—3 of Figure 2.

Figure 4 is a cross section on the line 4—4 of Figure 3, and

Figure 5 is an exploded view of the turkey caller, the parts being shown in perspective.

There is illustrated a bird caller generally indicated by the reference character 10, which consists of a sound box 11 and a sound producing vibrator 12.

The sound box 11, in the present instance is of rectangular shape, the respective ends of which are preferably of arcuate formation so as to readily fit within the palm of a hand of a user, as illustrated in Figure 1, as well as to eliminate sharp edges. The sound box may be constructed from any suitable wood, plastic and similar materials, having a vertical thickness permitting the construction of a medial division wall 13, thus providing an upper elongated compartment 14 and a lower compartment 15, one end of which is closed by a wall 16. Medially of the wall 13 intermediate the length thereof a circular opening 16' is formed of approximately one inch diameter so as to afford an area about which the sound producing stylus may be oscillated, as will be presently described.

The longitudinal edges of the lower compartment 15 have inwardly directed opposed, tapered flanges 17 forming a guideway for slidably receiving tapered longitudinally extending tongues 18 formed in the body of the sound vibrator 12. Inwardly of the open end 19 of the sound box, a light weight leaf spring 20 is secured, the free end of which is formed with a bill 21 for releasable retention of the vibrator 12 within the guide-way of the sound box.

The upper compartment 14 of the sound box has firmly secured therein a sheet of slate 22, the ends of which are shaped to conform to the ends of the sound box, which is employed in the production of the bird call sound, it being noted that the slate overlies the opening 16 of the partition which is of importance in the production of varying calling effects.

The vibrator 12 is of rectangular formation of the same material constituting the sound box, and as clearly shown is of hollow formation, by virtue of an opening 23, the latter being closed at one end by a wall 24. Centrally of the wall 24, a bore 25 is formed for rigid securement of a cylindrical stylus or sound producing rod 26 of a length to extend through and beyond the opening 23 a suitable distance. The rod 26 is preferably formed from wood of suitable resonating qualities and preferably the operative end is charred as at 27 to provide effective contact upon the surface of the slate 22.

It is essential to have the stroking surface of the slate roughened slightly, and this is accomplished in the provision of a sheet of fine emery cloth or paper 28. The dimensions of the paper or cloth is such as to be accommodated within the compartment 15 when the vibrator 12 is housed in the compartment, as best seen in Figures 3 and 4.

In use, the vibrator 12 is removed from the sound box 11 by depressing the spring 21 permitting ready sliding movement of the vibrator along the guide ways of the sound box which will also permit removal of the cloth or paper 28. The sound box 11 may be held in the palm of the hand as shown in Figure 1 and by rotating the point of the stylus 26 in and around the surface of the slate above the opening 26, a perfect deep tone call of a wild turkey will be produced, yet by a slight deviation from such area, a similar motion will produce a sharp yelp which is a characteristic of wild turkeys at times. Further by cupping the hand upon the sound box, as well as by varying the grip upon the vibrator, the sharpness or softness of the sound produced may be nicely controlled.

While I have shown and described a preferred form of the invention, this is by way of illustration only, and I consider as my own, all such modifications in construction as fairly fall within the scope of the appended claim.

I claim:

A turkey caller comprising a sound box having a medial division wall defining opposed upper and lower compartments, said wall having an opening intermediate the length thereof, a slate plate securely fixed in the upper compartment and in contacting relation in and about said opening, said lower compartment having an open end and opposed guide-ways, a sound vibrator comprising a body member having respective side portions complemental to said guide-ways for slidable movement therein, said vibrator having a stylus for movements upon said slate when removed from said lower compartment.

References Cited in the file of this patent

UNITED STATES PATENTS

| | | |
|---|---|---|
| 1,034,307 | Saunders | July 12, 1912 |
| 1,567,803 | Ludwig | Dec. 29, 1925 |
| 2,515,023 | Thomson et al. | July 11, 1950 |
| 2,629,968 | Herter | Mar. 3, 1953 |
| 2,678,517 | Gibson | May 18, 1954 |